3 Sheets—Sheet 1.
W. C. WESTAWAY.
GRINDING MILL.
No. 10,634. Reissued Aug. 11, 1885.
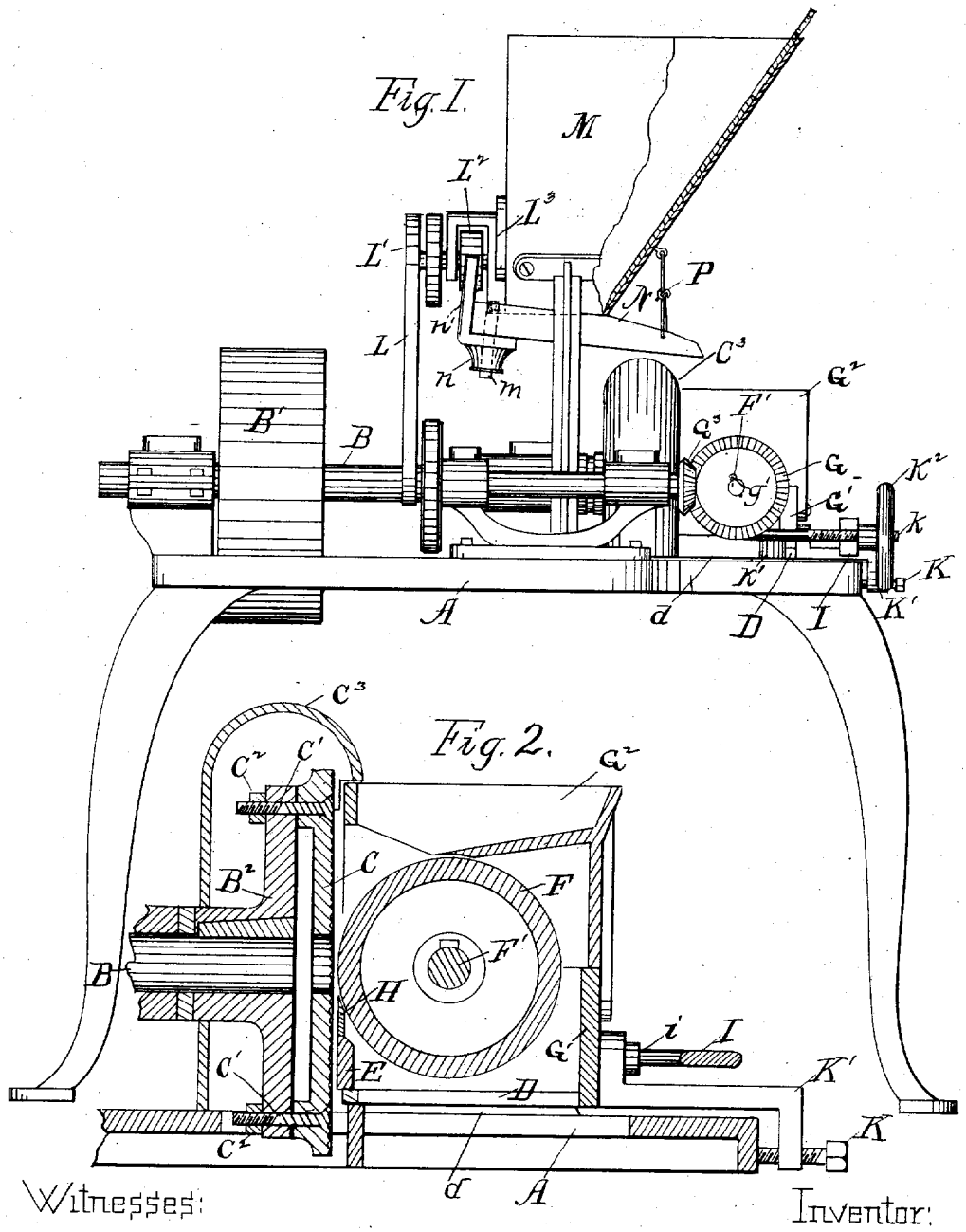
Witnesses:
E. L. Thurston
F. W. Brainerd
Inventor:
Walter C. Westaway
by Hill & Dixon
his Attorneys
N. PETERS, Photo-Lithographer, Washington, D. C.

3 Sheets—Sheet 2.

W. C. WESTAWAY.

GRINDING MILL.

No. 10,634. Reissued Aug. 11, 1885.

Witnesses
E. L. Thurston
F. M. Brainard

Inventor
Walter C. Westaway
by Hill & Dixon
His Attorneys.

N. PETERS, Photo-Lithographer, Washington, D. C.

3 Sheets—Sheet 3.

W. C. WESTAWAY.

GRINDING MILL.

No. 10,634. Reissued Aug. 11, 1885.

Witnesses:

E. L. Thurston

F. M. Brainerd

Inventor:

Walter C. Westaway by Hill & Dixon his Attorneys.

N. PETERS, Photo-Lithographer, Washington, D. C.

UNITED STATES PATENT OFFICE.

WALTER C. WESTAWAY, OF BELOIT, WISCONSIN.

GRINDING-MILL.

SPECIFICATION forming part of Reissued Letters Patent No. 10,634, dated August 11, 1885.

Original No. 309,326, dated December 16, 1884. Application for reissue filed June 29, 1885.

*To all whom it may concern:*

Be it known that I, WALTER C. WESTAWAY of Beloit, county of Rock, formerly of Delavan, in the county of Walworth and State of Wisconsin, have invented certain new and useful Improvements in Grinding-Mills; and I do hereby declare that the following is a full, clear, and exact description thereof.

The principle of my invention, which distinguishes it from all prior grinding-mills, consists in opposing to the end of a rotating grinding disk or cylinder, at one side of the center of rotation thereof, the periphery of a rotating roller and the surface of a stationary grinding-plate, the surfaces of the disk and roller moving in the same direction, and the material being fed between them in the direction of such motion, where it is crushed and partially ground, after which it passes between the disk and grinding-plate, where the grinding is completed.

The best mode in which I have contemplated applying this principle consists in using a flat circular rotating disk opposed to a roller of cylindrical form, and a flat grinding-plate practically of the same length as the roller and located just below it, all having their surfaces dressed for grinding purposes, substantially as herein described, although the principle is not limited to any matter of mere form.

The invention consists, broadly, in the combination of a roller and a grinding-plate with a disk or cylinder operating upon the principle above set forth; and, secondly, in the several sub-combinations employed by me in the particular form of apparatus herein shown as an embodiment of said principle.

Figure 3:
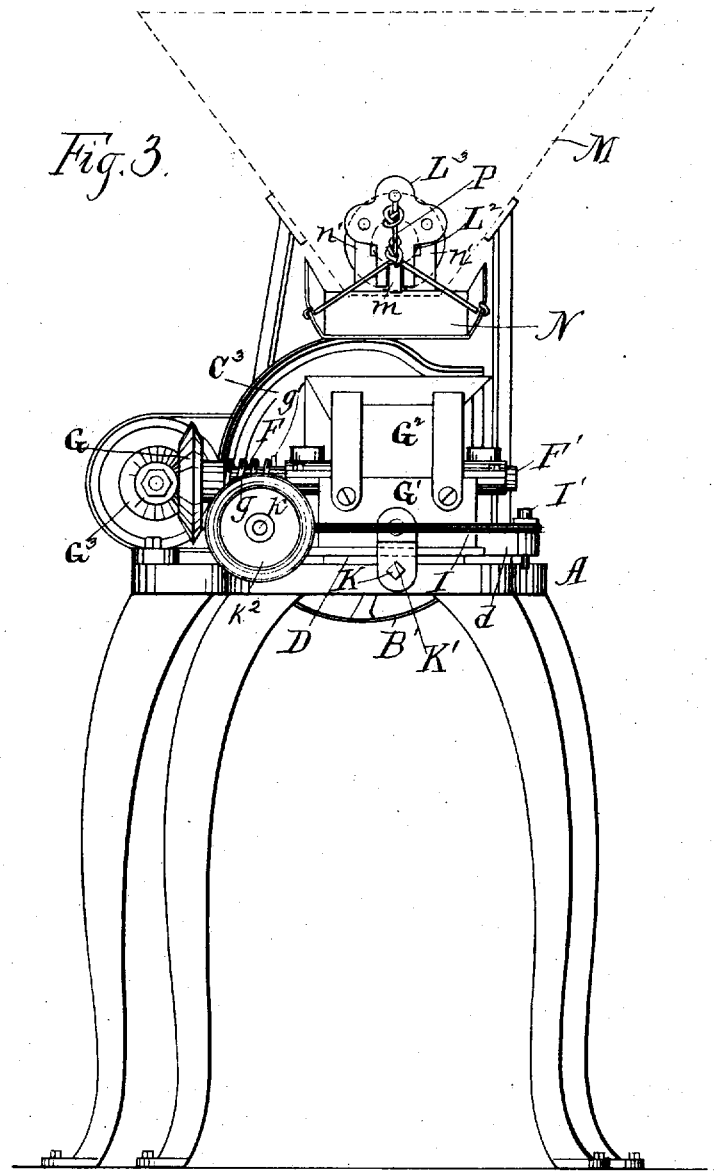
Figure 4:
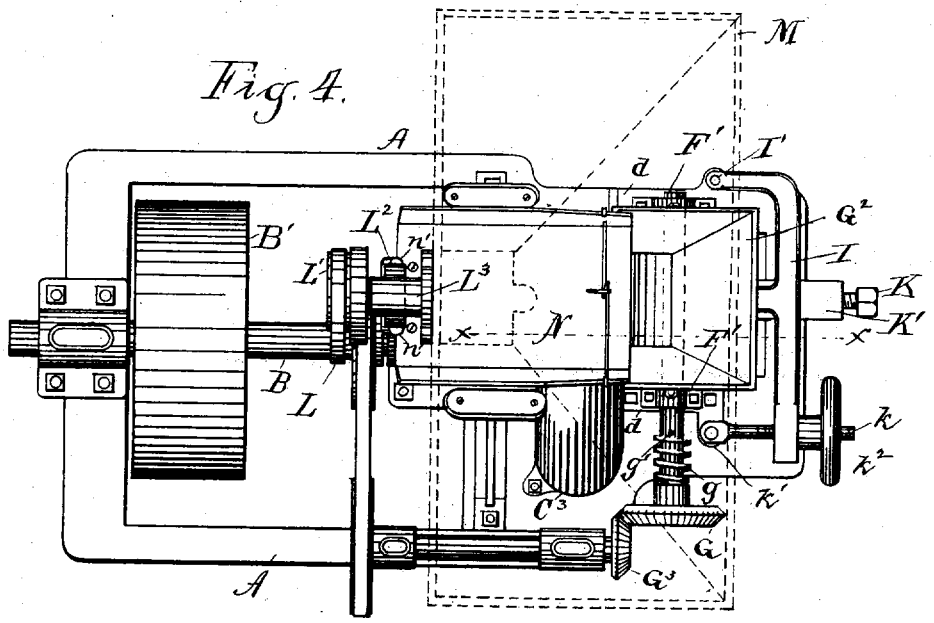
Figure 5:
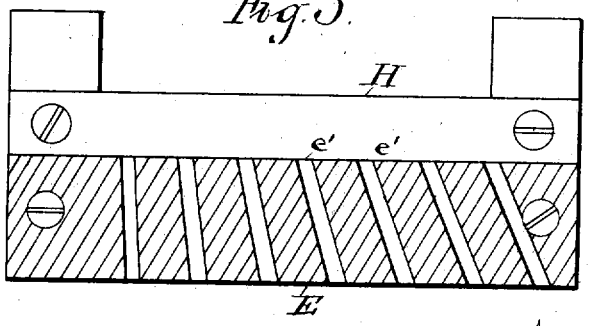

In the drawings, Figure 1 is a side elevation of a grinding-mill embodying my invention, with a portion of the hopper broken away. Fig. 2 is a vertical section on line *x x* of Fig. 4. Fig. 3 is a front elevation. Fig. 4 is a plan view; and Fig. 5 is a detached elevation of the grinding plate or knife.

A is a stand or table, upon which the grinding portion of my device rests.

B is the driving-shaft, which carries the driving-pulley B′, and has keyed to it a disk, $B^2$, and to the face of this disk is secured a grinding-disk, C, by screw-bolts C′ and nuts $C^2$. This disk $B^2$ and plate C project through an opening in the table or frame, and are revolved by the shaft B, the two being partially inclosed by a hood, $C^3$.

D is a slide that travels in ways *d*, that are fixed to the table, and this slide carries the grinding-plate E on the lower edge of its inner face, and also carries the shaft F′, on which a roller, F, is keyed, as well as a friction bevel-wheel, G. The roller F is inclosed on three sides by a housing, G′, and a superimposed hopper, $G^2$, from which hopper the grain or other material to be ground is guided onto the roller F. The roller F is arranged to oppose the rotary disk C at one side of the center of the latter. The opposing surfaces of the disk and roller rotate in the same direction, and in a machine constructed as herein shown perform the double function of assisting the feed of the material to be ground and of crushing and grinding it as it passes between them, said surfaces being substantially parallel along their proximate lines and in close proximity to each other. A partial grinding of the material is effected by the action of the roller F and rotary disk C co-operating together, as above described. The further and final reduction of the material is effected by applying the grinding-plate E in such a manner as to oppose the rotary disk C below the point or line where the disk and roller perform their work, as shown in the drawings. The upper edge of the plate E has resting upon it or formed with it a knife, H, which acts as a scraper to free the roller of the grain and guide it between the grinding-surfaces of the disk and the grinding-plate E. While the face of the knife adjacent to the disk C is perfectly smooth and vertical, the grinding-plate proper is provided with file-teeth or ridges, that are inclined from a vertical line, and these are crossed by vertical or oppositely-inclined grooves *e*′, which are much deeper than the grooves that form the file-edges, and serve both to admit the grain to the grinding-plate in position to be acted upon by the grinding-disk and to discharge the meal and prevent choking. The slide D is held up in position to carry the roller and grinding-plate into close proximity to the grinding-disk by a lever, I, that is pivoted to the table by a rivet, I′, and has a lug, *i*, on its face, that bears against a corresponding lug on the slide or face of hopper G′; but the nearness of the grinding-plate to the disk C is regulated by a set-bolt, K, that projects through a bracket-arm, K′, of the housing, and impinges against the edge of the table, as shown in Fig. 2. The pivot I′ of the lever I is preferably made only strong enough to resist the pressure caused by the wedging of the grain between the roller and grinding-disk, but should be weak enough to break if a nail or any other hard foreign substance that would tend to injure the grinding-faces be carried between them; or the lever itself might be made to give and permit such substance to pass through without injury to the grinding-faces. The lever has a horizontal opening through the end opposite the pivot, and a bolt, $k$, that is pivoted to a lug, $k'$, on the table, passes through this opening, and is screw-threaded to receive a set-nut, $k^2$, by screwing in which the lever I is clamped against the slide, and is forced toward the grinding-disk as far as set-bolt K will permit it to go. The friction-wheel G has a slight longitudinal play on its shaft F′, and is held out against a cone-wheel, $G^3$, by a spring, $g$, that acts between its hub and a pin, $g'$, in shaft F; and the tension of the spring should be so regulated that it will only exert a sufficient pressure upon the cone $G^3$ to take enough power to revolve the roller F when only enough grain is being fed to enable the grinding parts to do their work without choking. Therefore when the machine is clogged the friction-gearing will slip, and the roller F will not be forced to revolve until the machine relieves itself. The shaft B furnishes the power through a belt, L, and a pulley, L′, to turn the shaft of an eccentric, $L^2$, which shaft works in a bracket, $L^3$, that is secured to the rear of the hopper M. A bolt, $m$, is pivoted to the lower end of one arm of bracket $L^3$, and depends therefrom in position to pass through a bushing, $n$, in the rear part of an apron, N. The bushing $n$ is made L-shaped in longitudinal section, and has two extensions, $n'$ $n'$, that straddle the eccentric $L^2$ from below, and the apron is held upon the bolt $m$ by a suitable pin or key, as shown in Fig. 1. The proper inclination is given to the apron N by shortening or lengthening a front suspending-cord, P. When the parts are all properly adjusted, the arms $n'$ $n'$ will lie snugly against the eccentric, the slot formed by them conforming to the curve of the eccentric, and, therefore, as the eccentric turns it will alternately depress the rear end of apron N and flirt it horizontally, thus giving it a motion peculiarly adapted for distributing the material nicely from the hopper to the roller.

Having thus described my invention, what I claim as new, and desire to secure by Letters Patent, is—

1. The combination of a rotary grinding-disk with an opposing roller and a stationary grinding-plate, substantially as described.

2. The combination, with a horizontal arbor and a grinding-disk mounted thereon, of an opposing roller, a stationary grinding-plate, and a clearing-knife, as set forth.

3. The combination, with a horizontal arbor and a grinding-disk mounted thereon, and the driving mechanism provided with friction gear-wheel $G^3$, of the roller F, and its shaft, and a friction-wheel adapted to yield in the direction of the length of the shaft, substantially as and for the purpose set forth.

4. The combination of lever I and its connections with the supporting-frame, slide D, grinding-plate, the roller, the slide-bracket, arm K′, and bolt $k$, substantially as set forth.

5. The combination, with the supporting-frame and hopper M, having bracket $L^3$, a shaft journaled in said bracket, and an eccentric, $L^2$, carried thereby, of the apron N, having bushing $n$, provided with extensions $n'$ $n'$, and the adjustable suspending device P, substantially as shown and described, and for the purpose set forth.

WALTER C. WESTAWAY.

Witnesses:

C. M. ALVERSON,
W. H. WHEELER.